_(12)_ United States Patent
Bondarenko et al.

(10) Patent No.: US 12,320,643 B2
(45) Date of Patent: Jun. 3, 2025

(54) METHOD OF MEASUREMENT NEAR-BIT MAGNETIC COMPASS READING INTERFERENCE FROM A DOWNHOLE COMPONENT

(71) Applicant: Baker Hughes Oilfield Operations LLC, Houston, TX (US)

(72) Inventors: Alexey Bondarenko, Novosibirsk (RU); Gunnar Tackmann, Lower Saxony (DE); Dominik Hoheisel, Lower Saxony (DE); Veronica Vanessa Herrera Bano, Niedersachsen (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 18/194,290

(22) Filed: Mar. 31, 2023

(65) Prior Publication Data
US 2023/0341226 A1    Oct. 26, 2023

Related U.S. Application Data

(60) Provisional application No. 63/326,650, filed on Apr. 1, 2022.

(30) Foreign Application Priority Data

Jun. 23, 2022  (EA) ................................. 202291627

(51) Int. Cl.
*G01V 3/26*     (2006.01)
*E21B 7/04*     (2006.01)
(Continued)

(52) U.S. Cl.
CPC ................ *G01C 17/38* (2013.01); *E21B 7/04* (2013.01); *E21B 44/00* (2013.01); *E21B 47/013* (2020.05); *E21B 47/024* (2013.01); *E21B 47/092* (2020.05)

(58) Field of Classification Search
CPC ....... G01V 3/26; G01R 33/12; G01R 33/0017
See application file for complete search history.

(56) References Cited

U.S. PATENT DOCUMENTS 10,316,642 B2   6/2019  Kuckes
2001/0041963 A1  11/2001  Estes et al.
(Continued)

FOREIGN PATENT DOCUMENTS

WO     9428280 A1    12/1994

OTHER PUBLICATIONS

International Search Report & Written Opinion in International Application No. PCT/US2023/017142, mailed Jul. 13, 2023; 7 pages.

*Primary Examiner* — Tara Schimpf
*Assistant Examiner* — Ursula Lee Norris
(74) *Attorney, Agent, or Firm* — CANTOR COLBURN LLP

(57) ABSTRACT

A drilling system includes a method of determining an orientation of a drill string in a borehole. Sensor readings of a magnetic field of a drill bit are obtained at a plurality of positions along a curve extending around the drill bit along a longitudinal bit axis from a first location to a second location. A drill string includes the drill bit and a downhole magnetic field sensor that obtains a measurement of a local earth magnetic field, wherein the measurement is affected by the magnetic field of the drill bit. A processor determines a magnetic dipole moment of the drill bit from the plurality of sensor readings, calculates a second measurement of the (Continued)

local earth magnetic field downhole using the magnetic dipole moment of the drill bit, and determines the orientation of the drill string from the calculated correction of the measurement of the local earth magnetic field.

15 Claims, 5 Drawing Sheets

(51) Int. Cl.
*E21B 44/00* (2006.01)
*E21B 47/013* (2012.01)
*E21B 47/0228* (2012.01)
*E21B 47/024* (2006.01)
*E21B 47/092* (2012.01)
*G01C 17/38* (2006.01)

(56) References Cited

U.S. PATENT DOCUMENTS

| | | |
|---|---|---|
| 2012/0013339 A1 | 1/2012 | Kuckes |
| 2014/0367170 A1 | 12/2014 | Hoehn et al. |
| 2018/0252838 A1* | 9/2018 | Tang ........................ G01V 3/26 |
| 2019/0048702 A1* | 2/2019 | Vorhoff ..................... E21B 7/06 |
| 2020/0270981 A1* | 8/2020 | Rodney ................... E21B 7/067 |
| 2024/0280722 A1* | 8/2024 | Tackmann ............... G01V 3/26 |

* cited by examiner

METHOD OF MEASUREMENT NEAR-BIT MAGNETIC COMPASS READING INTERFERENCE FROM A DOWNHOLE COMPONENT

CROSS-REFERENCE TO RELATED APPLICATIONS

This application claims the benefit of Eurasian Application Serial No. 202291627 filed Jun. 23, 2022 and U.S. Provisional Patent Application Ser. No. 63/326,650 filed Apr. 1, 2022, the disclosures of which are incorporated herein by reference in their entirety.

BACKGROUND

In the resource recovery industry, magnetic measurements can be obtained of the earth's magnetic field in the vicinity of a bottom end of a drill string in a borehole in order to steer the drill string. A magnetic sensor used to obtain the earth's magnetic field is generally located near a BHA component, e.g., drill bit. Measurements of the magnetic sensor can be affected by a magnetic field associated with the drill bit. The measurement of the earth's magnetic field at the magnetic sensor can therefore be inaccurate, thereby affecting the steering of the drill string. Accordingly, there is a need to compensate for the magnetic field of a drill bit when obtaining downhole measurements of the earth's magnetic field, in order to correct the value of near bit magnetic compass measurements as well as to estimate an accuracy of these compass measurements.

SUMMARY

In one aspect, a method of determining an orientation of a drill string in a borehole is disclosed. A plurality of sensor readings of a magnetic field of a drill bit are obtained at a location on the earth surface using a magnetic field sensor at a plurality of positions along a curve extending around the drill bit along a longitudinal bit axis from a first location to a second location. A magnetic dipole moment of the drill bit is determined from the plurality of sensor readings. A measurement of a local earth magnetic field is obtained using a downhole magnetic field sensor located in the drill string, wherein the measurement is affected by the magnetic field of the drill bit. A correction of the measurement of the local earth magnetic field is calculated using the magnetic dipole moment of the drill bit to compensate for the magnetic field of the drill bit. The orientation of the drill string is determined from the calculated correction of the measurement of the local earth magnetic field.

In another aspect, a drilling system is disclosed. The drilling system includes a bit field measuring device for obtaining a plurality of sensor readings of a magnetic field of a drill bit using a magnetic field sensor at a plurality of positions along a curve extending around the drill bit along a longitudinal bit axis from a first location to a second location, a drill string including the drill bit and a downhole magnetic field sensor for obtaining a measurement of a local earth magnetic field, wherein the measurement is affected by the magnetic field of the drill bit, and a processor. The processor is configured to determine a magnetic dipole moment of the drill bit from the plurality of sensor readings, calculate a correction to the measurement of the local earth magnetic field downhole using the determined magnetic dipole moment of the drill bit to compensate for the magnetic field of the drill bit, and determine an orientation of the drill string from the calculated correction of the measurement of the local earth magnetic field.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
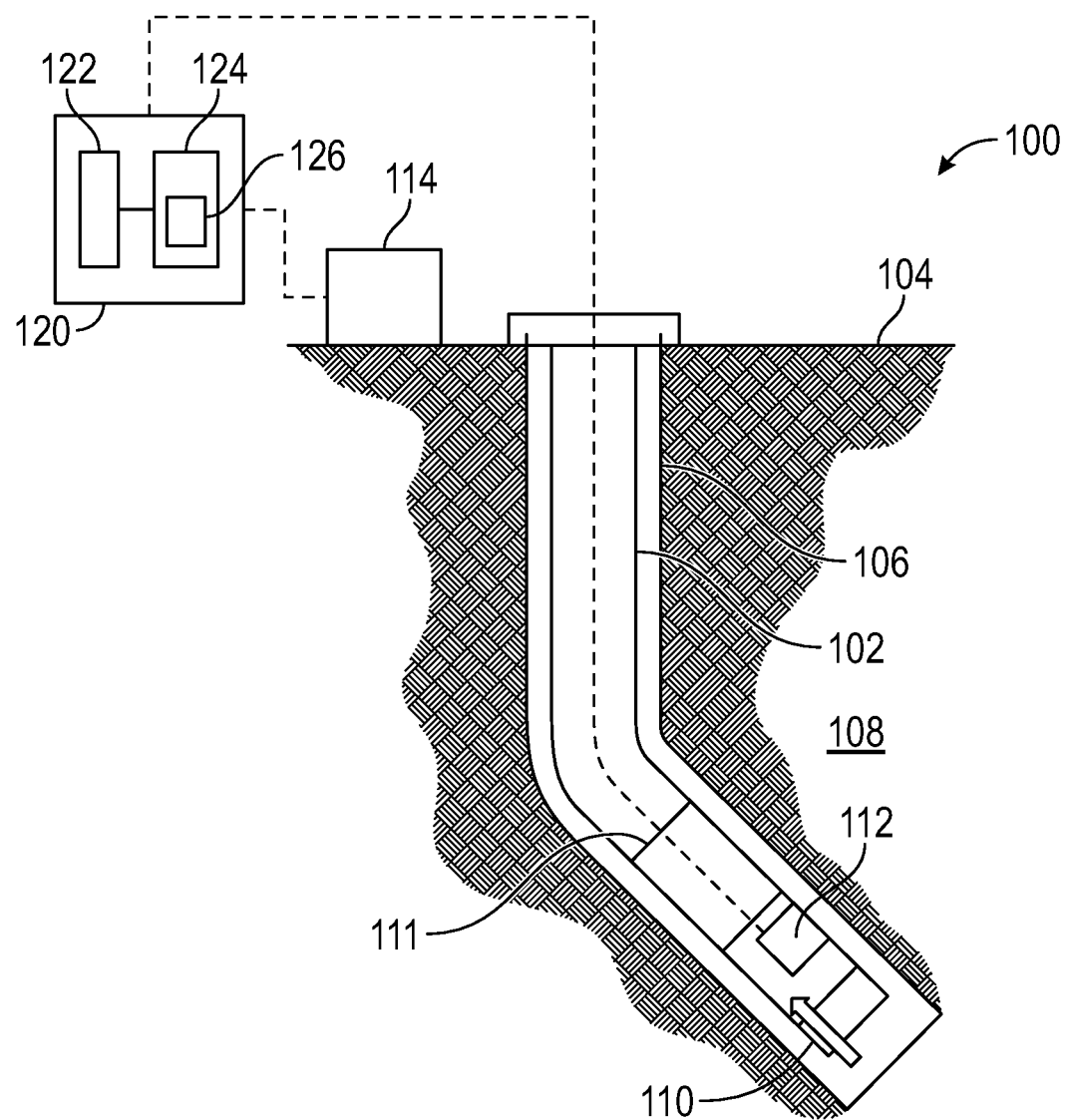
FIG. 1 shows a drilling system in an illustrative embodiment.

Referring to FIG. 1, a drilling system 100 is disclosed in an illustrative embodiment. The drilling system 100 includes a drill string 102 extending from an earth surface location 104 (location on the earth surface, outside the borehole) into a borehole 106 penetrating an earth formation 108. The drill string 102 includes a drill bit 110 at an end thereof for drilling the borehole 106. A bottomhole assembly 111 (BHA) in the drill string 102 and at a downhole end of the drill string 102 includes various components for performing downhole operations or for obtaining downhole measurements. The drill bit 110 being at the downhole end of the BHA 111. The drill string 102 includes a downhole magnetic field sensor 112 which can be used to measuring a property of the formation or local value of the earth's magnetic field. The magnetic field sensor 112 may be located in the BHA, such as in a measurement while drilling (MWD) tool or a steering device, such as a rotary steering system (RSS). The measurement of the local magnetic field of the earth can be sent to a control unit 120 for determining an orientation of the drill string in the borehole 106 in the earth formation 108 and thus to steer the drill string 102 while drilling the borehole. A correction can be made to the measurement before determining the orientation and steering the drill string 102, as disclosed herein. The control unit 120 can be at a surface location 104, as shown in FIG. 1, or can be at a downhole location along the drill string 102. Measurements performed downhole may be transmitted to the earth surface location 104 using a telemetry system, such as a mud pulse telemetry system, an electromagnetic telemetry system, an acoustic telemetry system or a wired pipe system. Determining an orientation of the drill string 102 includes determining an azimuth (geographic direction, such as north, east, south, west) and an inclination (vertical angle measured from a downhole direction) of the drill string 102 and the borehole 106, respectively. The downhole magnetic field sensor 112 in the drill string 102 allows detection of the azimuth. Azimuth and inclination are determined by downhole sensors (magnetometers, accelerometers, gyroscopes). Determining an orientation may further include determining a depth information (e.g. vertical depth or measured depth) measured by a depth measurement device, such as a depth decoder. The depth is added to the azimuth and inclination by the control unit 120 either downhole (downhole depth) or at the earth surface (surface depth). Determining the orientation may also include determining a toolface that defines the relative rotational orientation of the drill string 102 to a geographic reference direction. The steering of the drill string 102 may be performed by a rotary steerable system (RSS) or a downhole motor including an adjustable kick-off (AKO). The steering of the drill string 102 may be for the purpose of keeping the drill string within a hydrocarbon reservoir or for keeping the borehole at a predefined distance from a formation boundary (geo-steering). The steering of the drill string 102 may include transmitting downlinks (telemetry system) from the earth surface location 104 to the BHA in the borehole or may include automated geo-steering controlled by a control unit 120 inside the BHA without the interaction of a human being.

The control unit 120 includes a processor 122 and memory storage device 124 that includes a computer-readable medium. A set of programs or instructions is stored on the computer-readable medium. The processor 122 accesses the set of programs or instructions 126 to determine the orientation to the drill string 102 and to adjust an operation of the drill string 102 to steer the drill string 102 within the earth formation 108.

The downhole magnetic field sensor 112 is disposed near the drill bit 110, which can have its own magnetic field, referred to herein as the "bit magnetic field". The distance between the downhole magnetic field sensor 112 and the drill bit 110 can be in a range between about 0.1 centimeters and about 400 centimeters. Due to its proximity, the drill bit magnetic field can interfere with measurements made by the downhole magnetic field sensor 112 in the drill string 102, therefore perturbing the measurement of the local magnetic field of the earth. In addition, various components of the BHA 111 ("BHA components") can have magnetic fields that perturb the measurement of the local magnetic field of the earth performed downhole in the drill string 102. In an alternative embodiment the downhole magnetic field sensor 112 may be disposed near the BHA component having the magnetic field and perturbing the measurement of the local magnetic field of the earth.

The drilling system 100 includes a bit field measuring device 114 located at the earth surface location 104. Although the bit field measuring device 114 is discussed herein as measure a magnetic field of a drill bit, in other embodiments, the bit field measuring device 114 can be designed for measuring the magnetic field of other components, such as a BHA component. The bit field measuring device 114 can be used to measure the drill bit magnetic field either before the drill bit 110 is attached to the drill string 102 and deployed downhole or after the drill string 102 has been tripped out of the borehole 106 and the drill bit 110 has been removed from the drill string 102. The drill bit 110 is placed in the bit field measuring device 114 and its magnetic field is measured and/or profiled. The measured drill bit magnetic field is stored at the control unit 120 and is used to calculate a correction to a measurement of the local earth magnetic field performed in the drill string to compensate for the effect the bit magnetic field has on the measurement of the local earth magnetic field. The drill bit measuring device 114 may be deployed in a laboratory distant from a drilling system 100 or at a rig site close to the drilling system.

Figure 2:
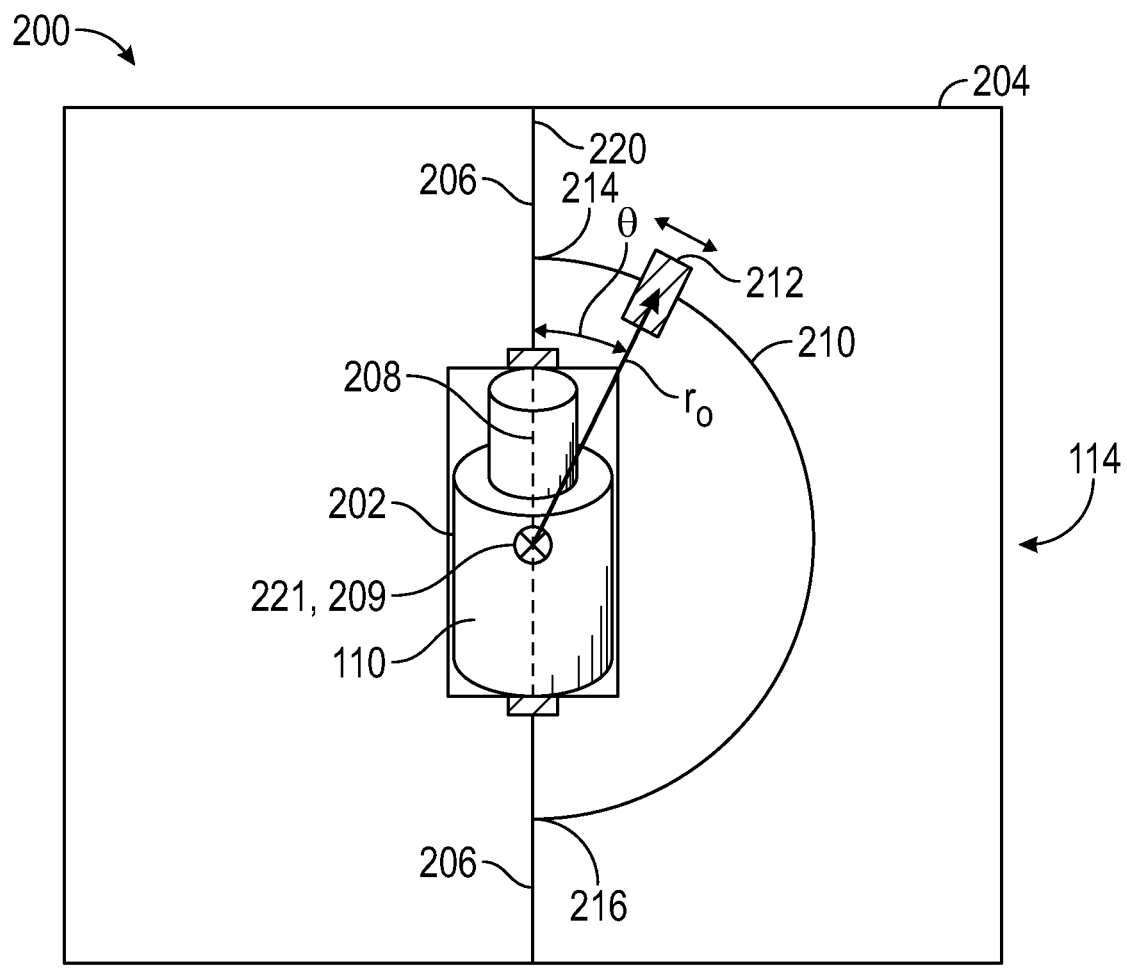
FIG. 2 shows a schematic illustration of the bit field measuring device in an embodiment.

FIG. 2 shows a schematic illustration 200 of the bit field measuring device 114 in an embodiment. The bit field measuring device 114 includes a carriage 202 for holding the drill bit 110 in place. The carriage 202 is made from a non-magnetic material (such as plastic (e.g. PEEK), aluminum, or wood). The carriage 202 is fixed to a housing 204 by retaining arms 206 which are aligned along a carriage axis 220. The carriage 202 holds the drill bit 110 so that a longitudinal bit axis 208 of the drill bit 110 is held in a fixed orientation within the carriage 202 and the housing 204. In various embodiments, the longitudinal bit axis 208 is aligned with the carriage axis 220. In an alternative embodiment the retaining arms 206 are not aligned with the carriage axis 220 but are oriented to the carriage axis by another angle, such as an angle between 1 to 90 degrees. In another embodiment the carriage 202 does not use any retaining arms to operatively connect to the housing 204 but uses a stand, a column, a pillar or any other suitable connecting element. In yet another embodiment, the carriage 202 is directly connected to the housing 204. In yet another embodiment, there is no housing 204 required to support the carriage 202.

The bit field measuring device 114 also includes a curve structure. The curve structure may be an arc structure 210 or other semi-circular structure. The curve structure or arc structure is made from a non-magnetic material (such as plastic (e.g. PEEK), aluminum, or wood). The arc structure 210 extends 180 degrees about the carriage 202 and about the drill bit (i.e., about a lateral carriage axis 221 and a lateral bit axis 209). A magnetic field sensor 212 is confined to the arc structure 210 and is able to move or slide along the arc structure 210 through a range of tilt angles θ measured from the carriage axis 220 or the longitudinal bit axis 208 along the arc structure to the position of the magnetic field sensor 212. The position of the magnetic field sensor is defined by the radius ($r_0$) from a center point of the arc structure to the position of the magnetic field sensor 212 on the arc structure 210. The magnetic field sensor 212 can be a Hall effect-based sensor or a gaussmeter, in various embodiments. The range of motion of the magnetic field sensor 212 includes 180 degrees of tilt angle θ from a first location 214 (0 degrees) along the longitudinal bit axis 208 above the drill bit 110 (i.e., a location proximate where the drill bit 110 attaches to the drill string 102 (first longitudinal end of the drill bit 110)) to a second location 216 (180 degrees) along the longitudinal bit axis 208 below the drill bit 110 (i.e., a location proximate cutters of the drill bit 110 (second longitudinal end of the drill bit 110)). Due to its orientation, the magnetic field sensor 212 measures a radial component (parallel to $r_0$) of the bit magnetic field at various tilt angles along the arc structure 210. The radial component is measured from a point that is the radial center of the arc structure 210. If the radial component is measured in a cylindrical coordinate system, the radial component is measured from the longitudinal bit axis 208 and perpendicular to the longitudinal bit axis 208. In another embodiment the range of tilt angles of the magnetic field sensor 212 may be smaller than 180 degrees, such as from 1 degree (first location) to 179 degrees (second location), from 3 degrees to 177 degrees, from 5 degrees to 175 degrees, from 10 degrees to 170. In one more embodiment the range of tilt angles may include more than 180 degrees, such as 0 degrees (or close to 0 degrees) to 190 degrees, to 270 degrees, or to 360 degrees. A measurement of the magnetic field of the drill bit 110 at locations close to the first location above the drill bit and a measurement of the magnetic field at the second location below the drill bit are suitable. A location close to the first location above the drill bit and a location close to the second location below the drill bit include a few degrees up to around 10 degrees diverting from the exact below location or exact above location. In one embodiment, the arc structure may be a solid mechanical structure (track) and the magnetic field sensor 212 may be moved either manually or automatically along the solid mechanical structure. Moving the magnetic field sensor may employ a motor and a controller to control the motor. In an alternative embodiment, the magnetic field sensor 212 may be installed on a tripod or equivalent construction and may be moved manually from one measurement position to the next measurement position along the arc. In yet another embodiment, instead of making magnetic field measurements at multiple positions along the arc structure, the measurements of the magnetic field around the drill bit may be performed along a curve structure being different to the arc structure. The curve structure includes measurement positions that are defined by a radius $r_{curve}$ and a tilt angle θ between the radius $r_{curve}$ and the longitudinal bit axis 220. While the arc structure uses a single radius $r_0$ for all tilt angles, the curve structure may use a different radius $r_{curve}$ for different tilt angles θ. The curve structure may be a 2-dimensional curve or a 3-dimensional curve. For a 2-dimensional curve, all $r_{curve}$ are within one plane. For a 3-dimensional curve, different $r_{curve}$ are within more than one plane. The curve structure may be a path on a sphere surrounding the drill bit 110 with the center of the sphere located inside the drill bit 110. The curve structure may extend at least 160 degrees around the drill bit 110 along the longitudinal bit axis 208.

For measuring the bit magnetic field with the bit field measuring device 114 of FIG. 2, the drill bit 110 is placed in bit field measuring device 114, e.g., in the carriage 202, and the magnetic field sensor 212 is moved along an arc to obtain magnetic field sensor readings. Correction can be made to the sensor readings to compensate for the impact of the earth's magnetic field as well as any background magnetic interference at the location of the magnetic field sensor in the bit field measuring device 114. The magnitude and direction of the earth's magnetic field at the location of the magnetic field sensor 212 may either be known (e.g., stored in a look-up table) or may be measured separately by either a different magnetic field sensor or by the magnetic field sensor 212 before the drill bit 110 is placed in the carriage 202 or after the drill bit 110 is removed from the carriage 202. The background magnetic interference may be measured by a different magnetic field sensor or by the magnetic field sensor 212 before the drill bit 110 is placed in the carriage 202 or after the drill bit 110 is removed from the carriage 202.

Figure 3:
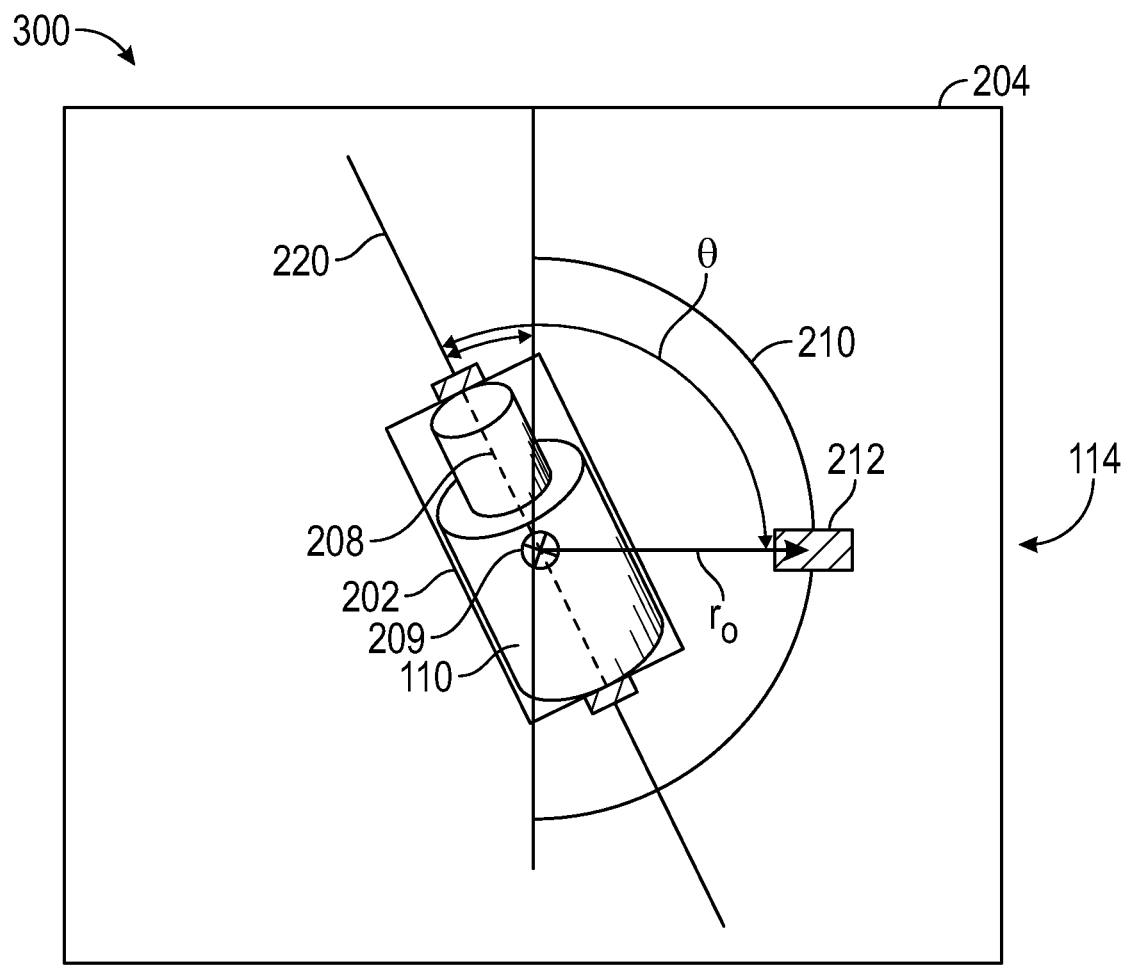
FIG. 3 shows a schematic illustration of the bit field measuring device in an alternate embodiment.

FIG. 3 shows a schematic illustration 300 of the bit field measuring device 114 in an alternate embodiment. The carriage 202 is a rotatable structure with respect to the housing 204 and the magnetic field sensor 212 and is able to rotate through a range of tilt angles θ that is from 0 degrees to 180 degrees from the magnetic field sensor 212. The rotatable structure of the carriage 202 rotates around a lateral bit axis 209. The lateral bit axis 209 is orthogonal to the longitudinal bit axis 208. The intersection point of the longitudinal bit axis 208 and the lateral bit axis forms the center point of the arc structure. A radius $r_0$ extends from the center point of the arc structure to the position of the magnetic field sensor 212 on the arc structure 210. The range of tilt angles θ is measured from the radius $r_0$ to the longitudinal bit axis 208. In operation, the drill bit 110 is disposed in the carriage 202. The magnetic field sensor 212 is held stationary at a single position on the arc structure 210 while the carriage 202 is rotated through a range of tilt angles θ with respect to the magnetic field sensor 212, in order to obtain magnetic field measurements along an arc that extends from a location above the drill bit 110 along the longitudinal bit axis 208 (i.e., the location proximate to where the drill bit 110 attaches to the drill string 102) to a location below the drill bit 110 along the longitudinal bit axis 208 (i.e., the location proximate to the cutters of the drill bit 110). When the tilt angle changes the orientation of the carriage axis 220 and the orientation of the longitudinal bit axis 208 changes while the position of the magnetic field sensor 212 remains the same. In one embodiment, since the magnetic field sensor 212 is held in place while the carriage 202 is rotated, an arc structure 210 for supporting the magnetic field sensor 212 is not required and can be replaced with any other suitable support structure. The carriage 202 may be rotated either by a motor or manually. Due to the stationary nature of the magnetic field sensor 212, the impact of background magnetic interference and of the earth's magnetic field on the sensor readings is generally negligible. Due to its orientation, the magnetic field sensor 212 measures a radial component of the bit magnetic field as the drill bit 110 rotates with the carriage 202 through the range of tilt angles θ. As described earlier, the range of tilt angles θ may be smaller or bigger than 180 degrees. In one embodiment the magnetic field sensor 212 may be a single sensor configured to measure the radial component (parallel to $r_0$) of the magnetic field associated with the drill bit 110. In an alternative embodiment, there may be multiple magnetic field sensors 212 along the arc structure 210. In one more embodiment, the magnetic field sensor 212 may be a three-axis magnetometer and the radial component is determined from the three axis measurements of the three-axis magnetometer.

Figure 4:
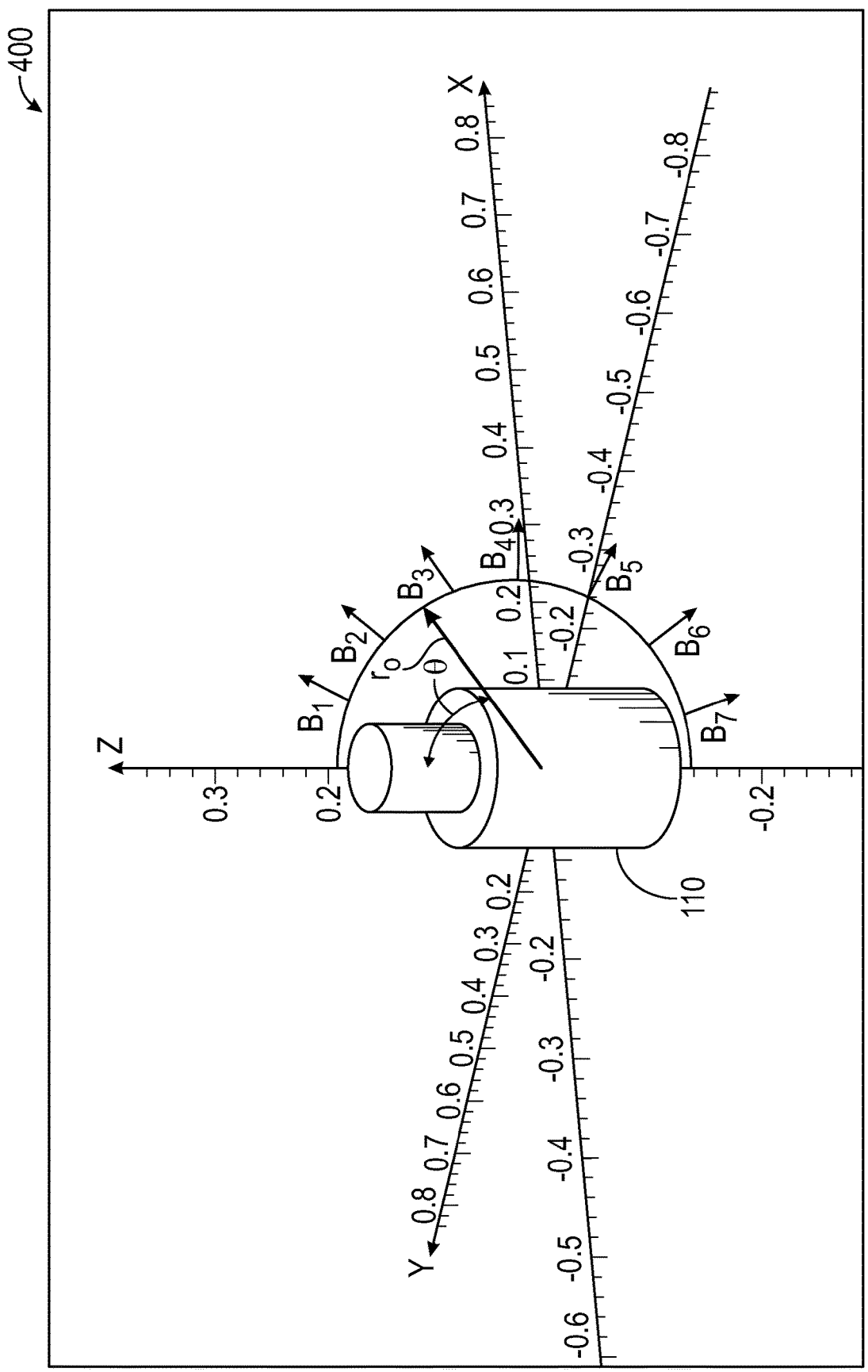
FIG. 4 illustrates magnetic measurements obtained for the drill bit.

FIG. 4 illustrates magnetic measurements 400 obtained for the drill bit 110. The magnetic field sensor 212 obtains sensor readings that are radial components of the bit magnetic field at a plurality of tilt angles θ. For illustrative purposes only, seven radial magnetic components B1-B7 are shown in FIG. 4. In general, the higher the number of sensor readings, the higher the accuracy of the determined magnetic field of the drill bit 110. The magnetic field measurements are obtained with the magnetic field sensor 212 at a radial distance $r_0$ and at a plurality of tilt angles θ along the arc structure 210. The radial distance $r_0$ can be within a range of a few millimeters and allows for near-field magnetic field measurements. In another embodiment the radial distance $r_0$ can be within a range of a few centimeters to a few tens of centimeters and allows for far-field magnetic field measurements. The radial distance $r_0$ is measured from the radial center of the arc structure. The radial center of the arc structure coincides with one of the center-of-mass of the drill bit 110 or half of the length of the drill bit along the longitudinal bit axis 208 of the drill bit 110. The distance of the magnetic field sensor 212 from the surface of the drill bit 110 can be in the range of a few centimeters to a few tens of centimeters. The angular distance between two measured magnetic components (e.g. B1 and B2) may be between 50 to 60 degrees, 30 to 40 degrees, 20 to 30 degrees, 10 to 20 degrees, or 5 to 10 degrees.

A magnetic dipole moment of the drill bit 110 is calculated as a weighted sum of the sensor readings at different tilt angles θ and is a numerical representation of the solution for a dipole moment in integral form. The bit magnetic field is therefore calculated as the magnetic field of an ideal dipole having the calculated magnetic moment. For longer tools, such as a BHA component, the tool's magnetic field can be calculated as a dipole if the distance to the directional magnetometers (downhole magnetic field sensor 112) in the BHA (compass from title) is long enough. For example, the drill bit 110 or BHA component can be treated as a dipole when a ratio of a distance between the compass and the drill bit 110 or BHA component divided by the length of the component is equal to or greater than a factor of 5. The distance between the compass and the drill bit 110 is measured from the upper end of the drill bit (pin end, where the drill bit is attached to the BHA 111). Alternatively, the distance between the compass and the drill bit 110 is measured from one of the center of mass of the drill bit or half the length of the drill bit along the longitudinal bit axis. Spherical harmonics are used to derive an expected dipole moment that matches the sensor reading. Then the bit dipole moment (based on the spherical harmonics) is used to calculate magnetic interference in the downhole local earth magnetic field measurements (performed downhole in the borehole 106).

The magnetic field outside a magnetized body such as a drill bit 110 can be expressed in the form of a series of spherical harmonics, based on the equations below:

$$\nabla \cdot B = 0, \quad \nabla \times H = 0, \quad B = \mu_0 H \quad \text{Eq. (1)}$$

where B is magnetic flux density, H is magnetic field strength, and $\mu_0$ is the permeability of free space. The magnetic flux density B can be expressed as a function of a magnetic scalar potential $\psi$, as shown in Eq. (2):

$$B = -\nabla \psi, \quad \nabla^2 \psi = 0. \quad \text{Eq. (2)}$$

The magnetic scalar potential can be expressed as a sum of spherical harmonics $Y_l^m$, as shown in Eq. (3):

$$\psi = \sum_{l \geq 1, m} C_{l,m} \frac{Y_l^m(\theta, \varphi)}{r^{l+1}} \quad \text{Eq. (3)}$$

where (r, $\theta$, $\varphi$) are the radial distance, polar angle, and azimuthal angle in a chosen spherical coordinate system. The radial component $B_r$ of the magnetic field is shown in Eq. (4):

$$B_r = -\frac{\partial \psi}{\partial r} = \sum_{l \geq 1, m} C'_{l,m} \frac{Y_l^m(\theta, \varphi)}{r^{l+2}} \quad \text{Eq. (4)}$$

where $C_{l,m}$ and $C'_{l,m}$ are series coefficients corresponding to scalar potential and radial component of magnetic flux density ($B_r$), respectively.

The zero term (l=0) is absent in Eq. (3) and Eq. (4) due to the lack of magnetic charges at the drill bit 110. Only first terms (l=1) in Eq. (4) produces magnetic interference. These first terms correspond to a magnetic dipole. Higher-order terms (l>1) are negligible due to a relatively high separation distance between the drill bit 110 and the magnetic field sensor 212. Measurements performed on field-returned and scrapped drill bits (e.g., drill bits that have been used downhole in a drilling operation) show magnetization along the longitudinal bit axis 208. This magnetization direction corresponds only to term with l=1, n=0 in series (3, 4).

The orthogonality of spherical harmonics $Y_l^m(\theta, \varphi)$ is used to calculate the $C'_{1,0}$ coefficient. The harmonic term $Y_1^0(\theta, \varphi)$ is equal to $\cos(\theta)$. Multiplying Eq. (4) by $\cos(\theta)$ and integrating over a surface S of a sphere with radius $r_0$ produces Eq. (5):

$$\int_{r=r_o} B_r \cos(\theta) \cdot dS = \int_{r=r_o} \sum_{l \geq 1, m} C'_{l,m} \frac{Y_l^m(\theta, \varphi)}{r^{l+2}} \cos(\theta) \cdot dS \quad \text{Eq. (5)}$$

Eq. (5) can be solved as shown in Eq. (6)-Eq. (9) to obtain the harmonic coefficient $C'_{1,0}$.

$$\int_{r=r_o} B_r \cos(\theta) \cdot dS = \int_{r=r_o} C'_{1,0} \frac{Y_1^0(\theta, \varphi)}{r^3} \cos(\theta) \cdot dS \quad \text{Eq. (6)}$$

$$\int_{r=r_o} B_r \cos(\theta) \cdot r^2 \sin(\theta) d\theta d\varphi = \quad \text{Eq. (7)}$$

$$\int_{r=r_o} C'_{1,0} \frac{Y_1^0(\theta, \varphi)}{r^3} \cos(\theta) \cdot r^2 \sin(\theta) d\theta d\varphi$$

$$\int_{r=r_o} B_r \cos(\theta) \cdot r^2 \sin(\theta) d\theta d\varphi = C'_{1,0} \frac{4\pi}{3 r_o} \quad \text{Eq. (8)}$$

$$C'_{1,0} = \frac{3 r_o^3}{4\pi} \int_{r=r_o} B_r \cos(\theta) \cdot \sin(\theta) d\theta d\varphi \quad \text{Eq. (9)}$$

For an axially symmetric magnetic field, $C'_{1,0}$ can be calculated numerically by integrating over $\varphi$ using the magnetic sensor readings (e.g., $B_1$-$B_7$) at a few points on the arc structure at radius $r=r_0$, as shown in Eq. (10):

$$C'_{1,0} = \frac{3 r_o^3}{2} \int_{r=r_o} B_r \cos(\theta) \cdot \sin(\theta) d\theta = \frac{3 \pi r_0^3}{4} \sum_i w_i B_r(\theta_i) \cos(\theta_i) \cdot \sin(\theta_i), \quad \text{Eq. (10)}$$

where $w_i$ is a weight and $\theta_i$ is coordinate of integration point of same quadrature formula; $B_r(\theta_i)$ are the sensor readings (e.g., $B_1$-$B_7$). In an embodiment, a Kronrod quadrature is used, as an example. Once the ideal magnetic field dipole for the drill bit is calculated, an interference of the drill bit 110 at a distance R can be calculated, as shown in Eq. (11):

$$B_z(R) = \frac{C'_{1,0}}{R^3} = \frac{3 \pi r_0^3}{4 R^3} \sum_i w_i B_r(\theta_i) \cos(\theta_i) \cdot \sin(\theta_i), \quad \text{Eq. (11)}$$

where R is distance from center of mass of drill bit 110 or half the length of the drill bit 110 along the longitudinal bit axis 208 to the magnetic field sensor 112 in the drill string or BHA 111. The direction parallel to the longitudinal axis of the drill string 102 is indicated by the z-coordinate. In an alternative embodiment the distance R is measured from the upper end (i.e., the pin end face) of the drill bit 110.

Assuming that errors in sensor reading at different measurement positions of the magnetic field sensor 112 are independent, it is possible to calculate a measurement error of the method disclosed herein using Eq. (12):

$$\Delta B_z(r) = \frac{3 \pi r_0^3}{4 R^3} \Delta B \sqrt{\sum_i (w_i \cos(\theta_i) \sin(\theta_i))^2}, \quad \text{(12)}$$

where $\Delta B$ is magnetic field sensor reading error and $\Delta B_Z(R)$ is the measurement error of magnetic interference from the drill bit 110 on a magnetic field measurement at a distance R. Using 5-point Kronrod quadrature with R=2.2 m, $r_0$=0.2 m, $\Delta B$=0.5·10$^{-4}$ T, the measurement error estimation $\Delta B_Z$(R)=30 nT. Magnetic fields can be calculated using an n-point numerical quadrature, in various embodiments. As the number of measurement points of the magnetic field of the drill bit 110 along the arc structure 210 increases, the magnetic field calculations become more precise. The measurement points do not need to be at equidistant tilt angles θ (as shown by $B_1$ to $B_7$ of FIG. 4). The number of measurement points may be between 2 and 20 measurements, such as 2 to 5 measurements, 2 to 10 measurements, or 2 to 20 measurements. In one embodiment the Konrod quadrature may benefit from an uneven number of magnetic field measurements around the drill bit 110 (e.g. 3, 5, 7, 9, 11, 13 . . . ). In case the measurement points $B_1$ to $B_x$ are not located on an arc structure instead of a Konrod quadrature an alternative numerical integration method may be used to determine the magnetic dipole of the magnetic field of the drill bit 110.

Figure 5:
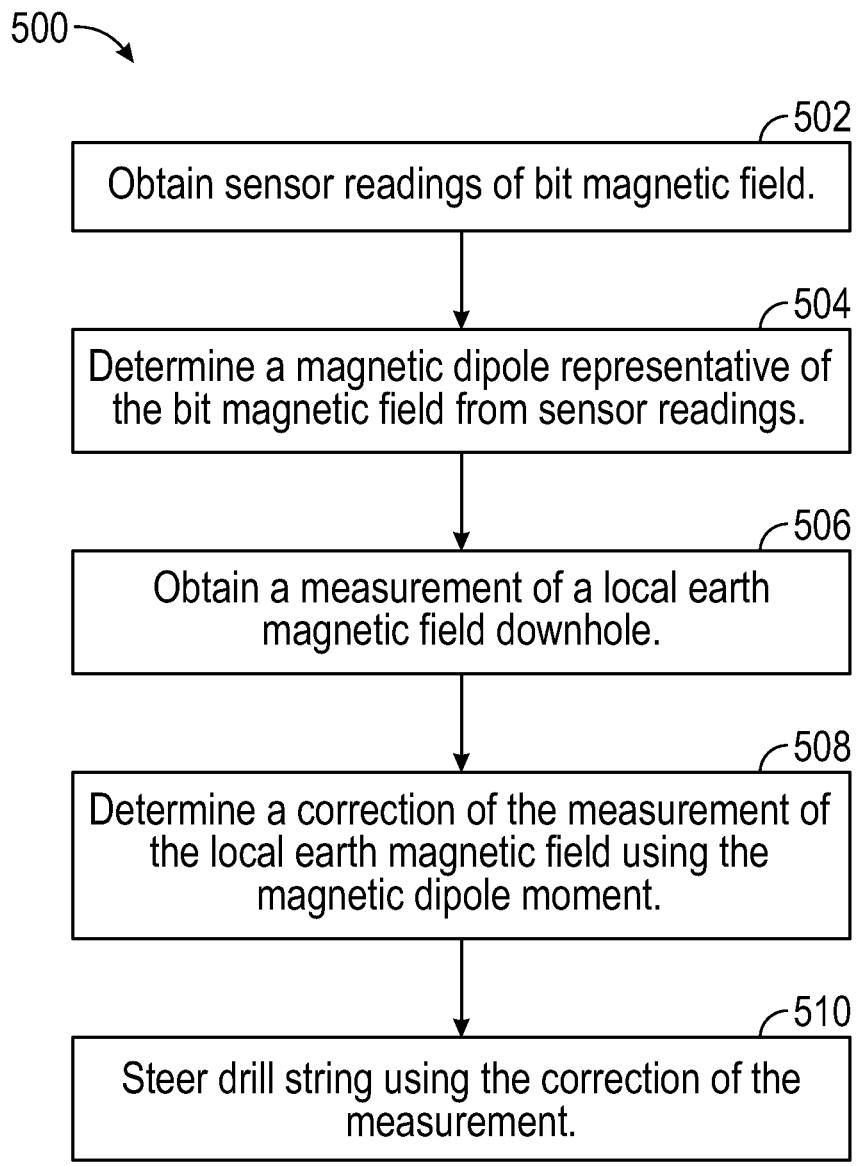
FIG. 5 shows a flowchart of a method for compensating downhole measurements for the presence of a bit magnetic field.

FIG. 5 shows a flowchart 500 of a method for compensating downhole measurements of the earth magnetic field for the presence of a bit magnetic field. In box 502, sensors readings of the bit magnetic field are measured using a magnetic field sensor at a bit field measuring device. In box 504, a magnetic dipole representing the bit magnetic field is determined using the sensor readings. In box 506, a downhole magnetic field sensor located in the BHA obtains a measurement of a local earth magnetic field, the measurement being affected by the bit magnetic field due to the proximity of the magnetic field sensor to the drill bit. In box 508, a correction to the measurement of the local earth magnetic field is calculated using the magnetic dipole moment. In box 510, the drill string is steered using the correction to the measurement.

Embodiment 1: A method of determining an orientation of a drill string in a borehole. A plurality of sensor readings of a magnetic field of a drill bit is obtained at a location of the earth surface using at least one magnetic field sensor at a plurality of positions along a curve extending around the drill bit along a longitudinal bit axis from a first location to a second location. A magnetic dipole moment of the drill bit is determined from the plurality of sensor readings. A measurement of a local earth magnetic field is obtained using a downhole magnetic field sensor located in the drill string, wherein the measurement is affected by the magnetic field of the drill bit. A correction of the measurement of the local earth magnetic field is calculated using the determined magnetic dipole moment of the drill bit. The orientation of the drill string is determined from the calculated correction of the measurement of the local earth magnetic field.

A method of determining an orientation of a drill string (102) in a borehole (106), comprising:

Embodiment 2. The method of any prior embodiment, wherein the curve extends at least 160 degrees around the drill bit from the first location to the second location, wherein the first location is closer to a first longitudinal end of the drill bit than the second location and the second location is closer to a second longitudinal end of the drill bit than the first location.

Embodiment 3. The method of any prior embodiment, wherein the curve is an arc and obtaining the plurality of sensor readings further comprises measuring a radial component of the magnetic field of the drill bit at each of the plurality of positions of the magnetic field sensor along the arc.

Embodiment 4. The method of any prior embodiment, further comprising using the radial component to determine a coefficient of a spherical harmonic indicative of the magnetic dipole moment of the drill bit.

Embodiment 5. The method of any prior embodiment, further comprising obtaining the plurality of sensor readings by moving the magnetic field sensor along the curve with respect to the drill bit.

Embodiment 6. The method of any prior embodiment, further comprising obtaining the plurality of sensor readings by maintaining the magnetic field sensor at a single position along the curve and rotating the drill bit.

Embodiment 7. The method of any prior embodiment, further comprising steering the drill string using the correction of the measurement of the local earth magnetic field.

Embodiment 8. The method of any prior embodiment, further comprising obtaining the plurality of sensor readings at one of: (i) before the drill bit is attached to the drill string and deployed downhole; and (ii) after the drill string has been tripped out of the borehole and the drill bit has been removed from the drill string.

Embodiment 9. A drilling system. The drilling system includes a bit field measuring device for obtaining a plurality of sensor readings of a magnetic field of a drill bit using a magnetic field sensor at a plurality of positions along a curve extending around the drill bit, along a longitudinal bit axis from a first location to a second location, a drill string including the drill bit and a downhole magnetic field sensor for obtaining a measurement of a local earth magnetic field, wherein the measurement is affected by the magnetic field of the drill bit, a processor configured to: determine a magnetic dipole moment of the drill bit from the plurality of sensor readings, calculate a correction of the measurement of the local earth magnetic field using the determined magnetic dipole moment of the drill bit, and determine an orientation of the drill string from the calculated correction of the measurement of the local earth magnetic field.

Embodiment 10. The drilling system of any prior embodiment, wherein the curve extends more than 160 degrees from the first location to a second location, wherein the first location is closer to a first longitudinal end of the drill bit than the second location and the second location is closer to a second longitudinal end of the drill bit than the first location.

Embodiment 11. The drilling system of any prior embodiment, wherein the curve is an arc and the magnetic field sensor obtains the plurality of sensor readings by measuring a radial component of the magnetic field of the drill bit at each of the plurality of positions of the magnetic field sensor along the arc.

Embodiment 12. The drilling system of any prior embodiment, wherein the processor is further configured to use the radial component to determine a coefficient of a spherical harmonic indicative of the magnetic dipole moment of the drill bit.

Embodiment 13. The drilling system of any prior embodiment, wherein the magnetic field sensor is configured to move along the curve with respect to the drill bit to obtain the plurality of sensor readings.

Embodiment 14. The drilling system of any prior embodiment, wherein the bit field measuring device includes a carriage for holding the drill bit, the carriage is rotatable with respect to the magnetic field sensor, and the magnetic field sensor is held at a single position and obtains the plurality of sensor readings as the carriage with the drill bit is rotated.

Embodiment 15. The drilling system of any prior embodiment, wherein the processor is further configured to steer the drill string using the correction of the measurement.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first,"

"second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of determining an orientation of a drill string in a borehole, comprising:
    obtaining a plurality of sensor readings of a magnetic field of a downhole component at a location on the earth surface by one of (i) moving a magnetic field sensor through a plurality of positions along a curve extending around the downhole component, and (ii) maintaining the magnetic field sensor at a single position along the curve extending around the downhole component and rotating the downhole component around an axis perpendicular to a longitudinal axis of the downhole component, wherein the curve extending around the downhole component extends along the longitudinal axis of the downhole component from a first location to a second location, wherein each of the plurality of positions defined by a tilt angle measured from the longitudinal axis of the downhole component, and wherein the first location is closer to a first longitudinal end of the downhole component than the second location and the second location is closer to a second longitudinal end of the downhole component than the first location;
    determining a magnetic dipole moment of the downhole component from the plurality of sensor readings;
    obtaining a measurement of a local earth magnetic field using a downhole magnetic field sensor located in the drill string containing the downhole component, wherein the measurement is affected by the magnetic field of the downhole component;
    calculating a correction of the measurement of the local earth magnetic field using the determined magnetic dipole moment of the downhole component;
    determining the orientation of the drill string from the calculated correction of the measurement of the local earth magnetic field; and
    drilling the borehole using the determined orientation of the drill string.

2. The method of claim 1, wherein the curve extending around the downhole component extends at least 160 degrees around the downhole component from the first location to the second location.

3. The method of claim 1, wherein the curve extending around the downhole component is an arc and obtaining the plurality of sensor readings further comprises measuring a radial component of the magnetic field of the downhole component at each of the plurality of positions of the magnetic field sensor along the arc.

4. The method of claim 3, further comprising using the radial component to determine a coefficient of a spherical harmonic indicative of the magnetic dipole moment of the downhole component.

5. The method of claim 1, further comprising obtaining the plurality of sensor readings at one of: (i) before the downhole component is attached to the drill string and deployed downhole; and (ii) after the drill string has been tripped out of the borehole and the downhole component has been removed from the drill string.

6. A drilling system, comprising:
    a magnetic field measuring device for obtaining a plurality of sensor readings of a magnetic field of a downhole component using a magnetic field sensor moved through a plurality of positions along a curve extending around the downhole component, wherein the curve extending around the downhole component extends along a longitudinal axis of the downhole component from a first location to a second location, wherein each of the plurality of positions defined by a tilt angle measured from the longitudinal axis of the downhole component, and wherein the first location is closer to a first longitudinal end of the downhole component than the second location and the second location is closer to a second longitudinal end of the downhole component than the first location;
    a drill string including the downhole component and a downhole magnetic field sensor for obtaining a measurement of a local earth magnetic field, wherein the measurement is affected by the magnetic field of the downhole component;
    a processor configured to:
        determine a magnetic dipole moment of the downhole component from the plurality of sensor readings;
        calculate a correction of the measurement of the local earth magnetic field using the determined magnetic dipole moment of the downhole component;
        determine an orientation of the drill string from the calculated correction of the measurement of the local earth magnetic field; and
        drill the borehole using the determined orientation of the drill string.

7. The drilling system of claim 6, wherein the curve extending around the downhole component extends more than 160 degrees around the downhole component from the first location to the second location.

8. The drilling system of claim 6, wherein the curve extending around the downhole component is an arc and the magnetic field sensor obtains the plurality of sensor readings by measuring a radial component of the magnetic field of the downhole component at each of the plurality of positions of the magnetic field sensor along the arc.

9. The drilling system of claim 8, wherein the processor is further configured to use the radial component to determine a coefficient of a spherical harmonic indicative of the magnetic dipole moment of the downhole component.

10. A drilling system, comprising:
- a magnetic field measuring device for obtaining a plurality of sensor readings of a magnetic field of a downhole component using a magnetic field sensor at a plurality of positions along a curve extending around the downhole component, wherein the curve extending around the downhole component extends along a longitudinal axis of the downhole component from a first location to a second location, wherein the magnetic field measuring device includes a carriage for holding the downhole component, wherein the carriage is rotatable with respect to the magnetic field sensor, and wherein the magnetic field sensor is held at a single position and obtains the plurality of sensor readings as the carriage with the downhole component is rotated;
- a drill string including the downhole component and a downhole magnetic field sensor for obtaining a measurement of a local earth magnetic field, wherein the measurement is affected by the magnetic field of the downhole component;
- a processor configured to:
    determine a magnetic dipole moment of the downhole component from the plurality of sensor readings;
    calculate a correction of the measurement of the local earth magnetic field using the determined magnetic dipole moment of the downhole component; and
    determine an orientation of the drill string from the calculated correction of the measurement of the local earth magnetic field.

11. The drilling system of claim 10, wherein the magnetic field sensor obtains the plurality of sensor readings by measuring a radial component of the magnetic field of the downhole component at each of the plurality of positions of the magnetic field sensor.

12. The drilling system of claim 10, wherein each of the plurality of positions of the magnetic field sensor is defined by a tilt angle measured from the longitudinal axis of the downhole component.

13. The drilling system of claim 10, wherein the carriage is rotated through a range of tilt angles with respect to the magnetic field sensor and the carriage is rotatable around an axis perpendicular to the longitudinal axis of the downhole component.

14. The drilling system of claim 10, wherein the curve extending around the downhole component is an arc and obtaining the plurality of sensor readings further comprises measuring the magnetic field of the downhole component at each of the plurality of positions of the magnetic field sensor along the arc.

15. The drilling system of claim 10, wherein the curve extending around the downhole component extends more than 160 degrees around the downhole component from the first location to the second location.

* * * * *